United States Patent
Abolbashari et al.

(10) Patent No.: US 10,007,109 B2
(45) Date of Patent: *Jun. 26, 2018

(54) WAVELENGTH DISCRIMINATING IMAGING SYSTEMS AND METHODS

(71) Applicants: Mehrdad Abolbashari, Charlotte, NC (US); Faramarz Farahi, Charlotte, NC (US)

(72) Inventors: Mehrdad Abolbashari, Charlotte, NC (US); Faramarz Farahi, Charlotte, NC (US)

(73) Assignee: THE UNIVERSITY OF NORTH CAROLINA AT CHARLOTTE, Charlotte, NC (US)

(*) Notice: Subject to any disclaimer, the term of this patent is extended or adjusted under 35 U.S.C. 154(b) by 267 days.

This patent is subject to a terminal disclaimer.

(21) Appl. No.: 14/219,302

(22) Filed: Mar. 19, 2014

(65) Prior Publication Data

US 2014/0375776 A1 Dec. 25, 2014

Related U.S. Application Data

(60) Provisional application No. 61/837,440, filed on Jun. 20, 2013.

(51) Int. Cl.
*G02B 27/00* (2006.01)
*H04N 13/02* (2006.01)

(52) U.S. Cl.
CPC ......... *G02B 27/005* (2013.01); *H04N 13/025* (2013.01); *H04N 13/0257* (2013.01); *H04N 13/257* (2018.05); *H04N 2209/048* (2013.01)

(58) Field of Classification Search
CPC ............... G02B 27/005; H04N 13/025; H04N 13/0257; H04N 2209/048; H04N 9/045; G01J 2003/1213; G01J 2003/2826; G01J 3/12; G01J 3/2823
USPC ...................... 348/280, 49; 356/326; 359/615
See application file for complete search history.

(56) References Cited

U.S. PATENT DOCUMENTS

| | | | |
|---|---|---|---|
| 5,920,390 A | 7/1999 | Farahi et al. | |
| 6,050,656 A | 4/2000 | Farahi et al. | |
| 6,184,535 B1* | 2/2001 | Kashima | G01N 21/6428 250/458.1 |
| 6,191,894 B1* | 2/2001 | Kitamura | G02B 15/173 359/676 |
| 6,980,710 B2 | 12/2005 | Farahi et al. | |
| 7,058,245 B2 | 6/2006 | Farahi | |

(Continued)

OTHER PUBLICATIONS

Subbarao et al., Depth from defocus: A spatial domain approach, International Journal of Computer Vision vol. 13, Issue 3, pp. 271-294, Kluwer Academic Publishers.

(Continued)

*Primary Examiner* — Behrooz Senfi
(74) *Attorney, Agent, or Firm* — Clements Bernard Walker PLLC; Christopher L. Bernard

(57) ABSTRACT

The present disclosure provides wavelength discriminating imaging systems and methods that spatially separate (over different depths) the wavelength constituents of an image using a dispersive lens system or element, such that this spectral information may be exploited and used. The wavelength constituents of an image are deconstructed and identified over different depths using a dispersive lens system or element.

30 Claims, 11 Drawing Sheets

(56) References Cited

U.S. PATENT DOCUMENTS

| | | | |
|---|---|---|---|
| 7,067,240 B2 | 6/2006 | Farahi et al. | |
| 7,126,976 B2 | 10/2006 | Farahi et al. | |
| 8,463,092 B2 | 6/2013 | Farahi | |
| 8,937,646 B1* | 1/2015 | Baldwin | H04N 13/0011 348/42 |
| 2003/0203524 A1 | 10/2003 | Farahi et al. | |
| 2006/0012852 A1* | 1/2006 | Cho, II | G02B 3/14 359/291 |
| 2006/0171263 A1* | 8/2006 | Cho, II | G02B 26/0841 369/44.23 |
| 2010/0019170 A1* | 1/2010 | Hart | A61B 1/043 250/459.1 |
| 2011/0206291 A1* | 8/2011 | Kashani | A61B 3/12 382/255 |
| 2011/0232211 A1 | 9/2011 | Farahi | |
| 2011/0285995 A1* | 11/2011 | Tkaczyk | G01J 3/02 356/326 |
| 2013/0215235 A1* | 8/2013 | Russell | H04N 13/0203 348/47 |
| 2013/0340543 A1 | 12/2013 | Farahi et al. | |
| 2014/0000704 A1 | 1/2014 | Farahi | |
| 2014/0009743 A1* | 1/2014 | Donitzky | A61B 3/1225 351/221 |
| 2014/0085622 A1* | 3/2014 | Wong | G01J 3/0278 356/5.04 |
| 2014/0176592 A1* | 6/2014 | Wilburn | H04N 5/23212 345/589 |
| 2014/0241633 A1* | 8/2014 | Flanders | G06K 9/0063 382/191 |
| 2014/0340570 A1* | 11/2014 | Meyers | H04N 5/211 348/370 |
| 2015/0054937 A1* | 2/2015 | Lippert | G02B 21/0028 348/80 |

OTHER PUBLICATIONS

Lertrusdachakul, A Novel 3D recovery method by dynamic (de)focused projection, Nov. 30, 2011, Ecole Doctorale Environnement—Sant'e / STIC (E2S).

Favaro et al., A Theory of Defocus via Fourier Analysis, Proc. of IEEE Conf. on Computer Vision and Pattern Recognition (2008).

Ng et al., Light Field Photography with a Hand-held Plenoptic Camera, Stanford Tech Report CTSR 2005-02.

Adelson et al., Single Lens Stereo with a Plenoptic Camera, IEEE Transactions on Pattern Analysis and Machine Intelligence, vol. 14, No. 2, Feb. 1992.

* cited by examiner

WAVELENGTH DISCRIMINATING IMAGING SYSTEMS AND METHODS

CROSS-REFERENCE TO RELATED APPLICATION

The present patent application/patent claims the benefit of priority of U.S. Provisional Patent Application No. 61/837,440, filed on Jun. 20, 2013, and entitled "WAVELENGTH DISCRIMINATING IMAGING SYSTEMS," the contents of which are incorporated in full by reference herein.

FIELD OF THE DISCLOSURE

The present disclosure relates generally to the fields of optics and imaging. More specifically, the present invention relates to wavelength discriminating imaging systems and methods that spatially separate the wavelength constituents of an object/scene using a dispersive lens system or element, such that this spectral information may be exploited and used. In other words, the wavelength constituents of the object/scene are deconstructed and identified over different depths using the dispersive lens system or element.

BACKGROUND OF THE DISCLOSURE

In general, spectral imaging is a technique used to image a scene or object at different wavelengths. There are different spectral imaging techniques, including multispectral imaging (imaging at specific wavelengths), hyperspectral imaging (imaging at many wavelengths), and full spectral imaging (acquiring data as a spectral curve). The proposed spectral imaging techniques use a modified form of a conventional imaging system (e.g. a camera), by adding a special lens or other accessory to the conventional imaging system.

The basics of the proposed spectral imaging techniques are based on the use of a dispersive lens system or element and depth measurement. By using a dispersive lens system or element, one can convert the wavelength constituents of a scene or object into depth information, and then use depth measurement techniques to measure the depth information, which represents the wavelength constituents of the scene or object. The proposed spectral imaging techniques have significant advantages over conventional selective filtering and point-by-point spectroscopy techniques, for example. In addition, the present disclosure provides a method for using a direct conventional image (monochromatic or multicolored, such as RGB) of a scene or object and a spectral imaging system to improve spatial and wavelength resolution, and to reduce or eliminate unwanted aberrations, as well as increase confidence levels (i.e. reduce error rates).

BRIEF SUMMARY OF THE DISCLOSURE

Again, in various exemplary embodiments, the present disclosure provides wavelength discriminating imaging systems and methods that spatially separate the wavelength constituents of an object/scene using a dispersive lens system or element, such that this spectral information may be exploited and used. In other words, the wavelength constituents of the object/scene are deconstructed and identified over different depths using the dispersive lens system or element. In addition, the present disclosure provides a method for using a direct conventional image (monochromatic or multicolored, such as RGB) of a scene or object and a spectral imaging system to improve spatial and wavelength resolution, and to reduce or eliminate unwanted aberrations, as well as increase confidence levels (i.e. reduce error rates).

In one exemplary embodiment, the present disclosure provides a spectral imaging system, comprising: a dispersive element operable for separating wavelengths associated with an image by distance; an algorithm operable for identifying the wavelengths associated with the image using the distance; and one or more sensors operable for determining intensity at different wavelengths. Optionally, the dispersive element comprises one or more lenses and a dispersive medium. Optionally, the dispersive medium comprises one or more dispersive lenses. Optionally, the dispersive element comprises one or more lenses with dispersion. Optionally, the system comprises a light field camera. Optionally, the system comprises a microlens array. Optionally, the system comprises an array of dispersive lenses. Optionally, the system comprises a translation mechanism operable for moving the one or more sensors and one or more lenses. Optionally, the system comprises a lens array having varying focal lengths. Optionally, the system comprises a lens array having varying displacements with respect to a lens array plane. Optionally, the system comprises a plurality of lens arrays having varying focal lengths and varying displacements with respect to a lens array plane. Optionally, the system comprises a lens and one or more beamsplitters/image splitters operable for dividing a beam/image from the lens into a plurality of beams/images. Optionally, the system comprises one or more filters operable for separating wavelengths. Optionally, the system comprises a profilometry algorithm operable for acquiring both depth and spectral information. Optionally, the system comprises one or more of a faceplate and a flexible fiber bundle. Optionally, the system comprises a beamsplitter/image splitter. Optionally, the system (or another spectral imaging system) comprises one or more of a faceplate and a flexible fiber bundle including an integrated beamsplitter/image splitter. Optionally, the system comprises one of a 2D or 3D grayscale imaging system or a 2D or 3D color imaging system. Optionally, the system comprises a beamsplitter/image splitter, wherein one or more outputs of the beamsplitter/image splitter are used in combination with one of a 2D or 3D grayscale imaging system or a 2D or 3D color imaging system. Optionally, the system comprises a beamsplitter/image splitter, wherein one or more outputs of the beamsplitter/image splitter are used in combination with a spectral imaging system to improve spatial and wavelength resolution, reduce or eliminate unwanted aberration, increase confidence levels, and reduce error rates. Optionally, the system comprises one more filters operable for separating wavelengths. Optionally, the system comprises two or more spectral imaging systems each operable over a specific wavelength range.

In another exemplary embodiment, the present disclosure provides a spectral imaging method, comprising: providing a dispersive element operable for separating wavelengths associated with an image by distance; providing an algorithm operable for identifying the wavelengths associated with the image using the distance; and providing one or more sensors operable for determining intensity at different wavelengths. Optionally, the dispersive element comprises one or more lenses and a dispersive medium. Optionally, the dispersive medium comprises one or more dispersive lenses. Optionally, the dispersive element comprises one or more lenses with dispersion. Optionally, the method includes providing a light field camera. Optionally, the method includes providing a microlens array. Optionally, the method includes providing an array of dispersive lenses. Optionally, the method includes providing a translation mechanism operable for moving the one or more sensors and one or more lenses. Optionally, the method includes providing a lens array having varying focal lengths. Optionally, the method includes providing a lens array having varying displacements with respect to a lens array plane. Optionally, the method includes providing a plurality of lens arrays having varying focal lengths and varying displacements with respect to a lens array plane. Optionally, the method includes providing a lens and one or more beamsplitters/image splitters operable for dividing a beam/image from the lens into a plurality of beams/images. Optionally, the method includes providing one or more filters operable for separating wavelengths. Optionally, the method includes providing a profilometry algorithm operable for acquiring both depth and spectral information. Optionally, the method includes providing the system (or another spectral imaging system) with one or more of a faceplate and a flexible fiber bundle. Optionally, the method includes providing a beamsplitter/image splitter. Optionally, the method includes providing one or more of a faceplate and a flexible fiber bundle including an integrated beamsplitter/image splitter. Optionally, the method includes providing one of a 2D or 3D grayscale imaging system or a 2D or 3D color imaging system. Optionally, the method includes providing a beamsplitter/image splitter, wherein one or more outputs of the beamsplitter/image splitter are used in combination with one of a 2D or 3D grayscale imaging system or a 2D or 3D color imaging system. Optionally, the method includes providing a beamsplitter/image splitter, wherein one or more outputs of the beamsplitter/image splitter are used in combination with a spectral imaging system to improve spatial and wavelength resolution, reduce or eliminate unwanted aberration, increase confidence levels, and reduce error rates. Optionally, the method includes providing one more filters operable for separating wavelengths. Optionally, the method includes providing two or more spectral imaging systems each operable over a specific wavelength range.

In a further exemplary embodiment, the present disclosure provides a confocal imaging system, comprising: a light source providing two or more wavelengths; and a dispersive lens system reducing or eliminating vertical scanning vertical scanning. Optionally, the light source comprises a white light source. Optionally, the light source comprises a broadband light source. Optionally, the light source comprises a tunable laser providing the two or more wavelengths. Optionally, the light source comprises two or more diode lasers providing the two or more wavelengths, respectively. Optionally, the polarity of the light source is controllable. Optionally, the system comprises three red, green, and blue lasers and an RGB color camera to capture three wavelengths simultaneously.

BRIEF DESCRIPTION OF THE DRAWINGS

The present invention is illustrated and described herein with reference to the various drawings, in which like reference numbers are used to denote like system components/ method steps, as appropriate, and in which.

DETAILED DESCRIPTION OF THE DISCLOSURE

Figure 1:
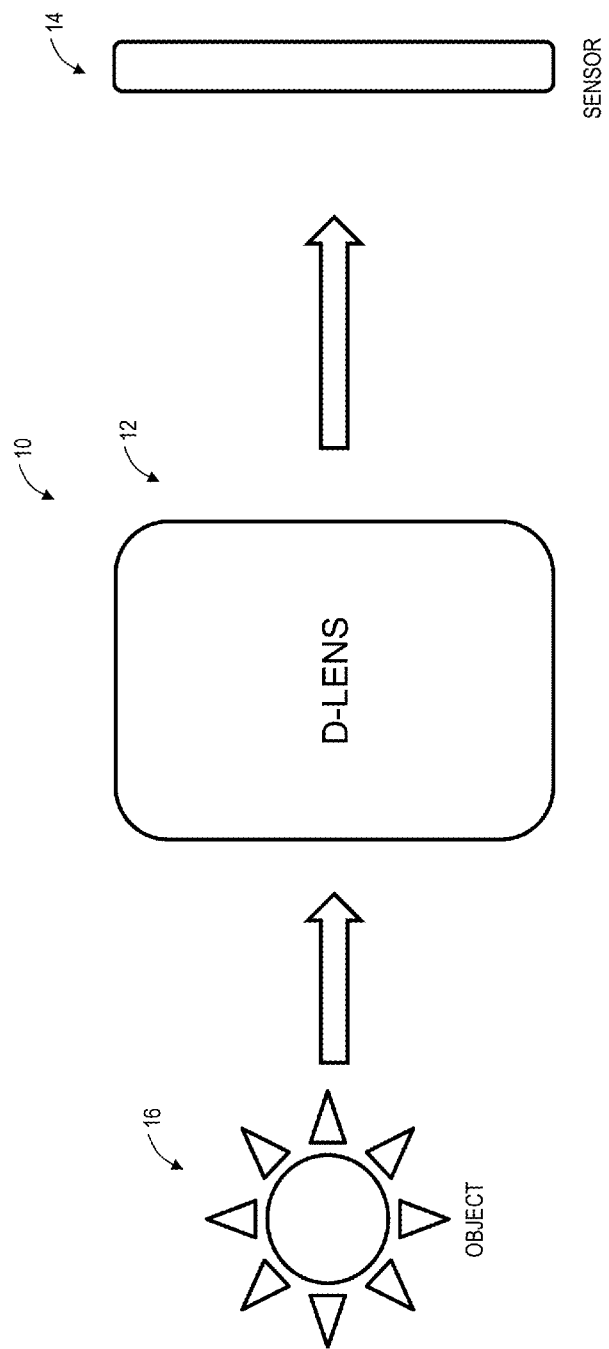
FIG. 1 is a schematic diagram illustrating one exemplary embodiment of the spectral imaging system of the present invention.

Referring specifically to FIG. 1, in one exemplary embodiment, the spectral imaging system 10 of the present disclosure is similar to a conventional camera, except for the lens. The conventional lens is replaced with a lens that consists of a dispersive element, a combination of lenses, a combination of dispersive elements, a dispersive element and a lens, or a dispersive material (collectively referred to herein as the "dispersive element," the "dispersive lens," or the "D-lens"). Since the D-lens 12 has dispersive properties (i.e. different wavelengths have different refractive indices, which results, for example, in different focal lengths) it produces an image on the sensor 14 that is sharp (i.e. in focus) for some wavelengths and blurred (i.e. out of focus) for other wavelengths. By taking N different images of an object 16 with different camera parameters and using conventional depth measurement techniques and algorithms, one can calculate the image at each specific wavelength.

There are different conventional methods to measure the volume of an object and recover depth. Depth from focus (DFF), depth from defocus (DFD), and light field photography are three examples of depth measurement techniques. In the DFF technique, several images are taken using different camera parameters. The images are focused (usually locally), and by analyzing these focused images, the depth information is calculated. This technique requires a plurality of images, fine measurement of the camera parameters, and accurate focus measurement. In the DFD technique, several images are taken using different camera parameters. The images can be as few as two and do not need to be in focus. To accurately recover depth information, the camera should be calibrated to extract the parameters of the camera and an accurate model is needed for blurring effects where the image is out of focus. In the light field photography technique, a light field is recorded and then processed to reconstruct the desired image. One problem that may be addressed using light field photography is refocusing; a light field image can be taken first and then refocused later. This technique has the potential to reconstruct several focused or blurred images from the captured light field. Thus, using this technique, one can synthesize several focused or defocused images after acquiring a light field and then analyze those images to recover depth information.

All of the above-mentioned depth measurement techniques are based on the fact that different points of the scene/object, that have different depths, have either different focus distances or different blurring radii (i.e. the radius of the circle of confusion). Given a two-dimensional (2-D) scene/object that has different wavelength content in different locations of the object, by using a D-lens, each point has a focus distance or blurring radius that depends on the wavelength content of that point of the scene/object and a dispersion property of the D-lens. Therefore, the wavelength content of the scene/object is encoded with the focus distance or blurring radius. Since this is equivalent to the problem of depth measurement, in which the depth information is encoded in the focus distance or blurring radius, one can use the same techniques to recover the wavelength content of the scene/object. In other words, the wavelength content of the scene/object is equivalent to the depth information that can be recovered using the various techniques described above. FIG. 1 illustrates spectral imaging using DFF or DFD techniques and FIG. 2 illustrates one possible implementation using a light field photography technique.

Figure 2:
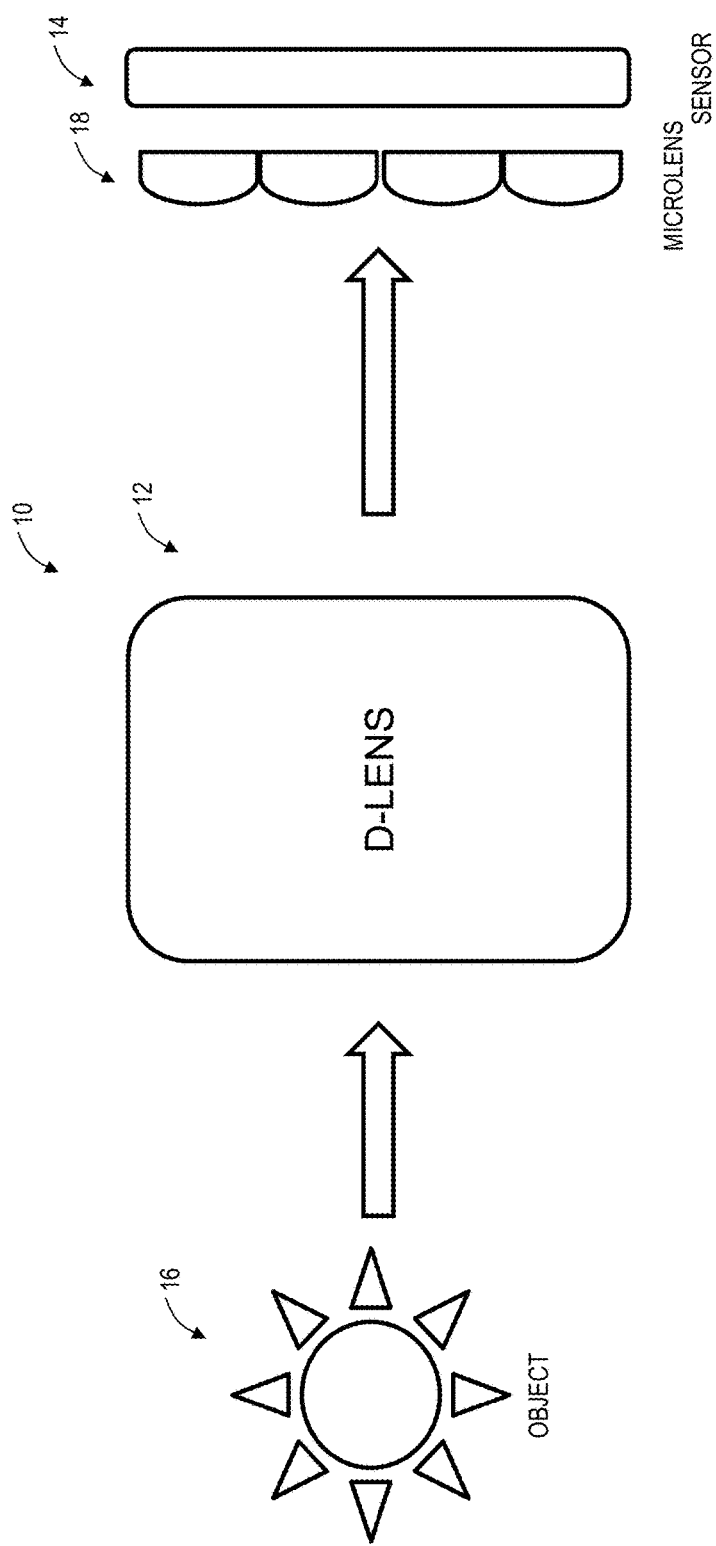
FIG. 2 is a schematic diagram illustrating another exemplary embodiment of the spectral imaging system of the present invention.

Referring specifically to FIG. 2, in another exemplary embodiment, the spectral imaging system 10 includes a main lens 12, a microlens array 18, and a photosensor array 14. If the main lens 12 is replaced by a D-lens 12, then different wavelengths are focused at different distances from the D-lens 12. By knowing the dispersion properties of the D-lens 12 and the camera parameters, depth (i.e. wavelength) information may be extracted.

Figure 3:
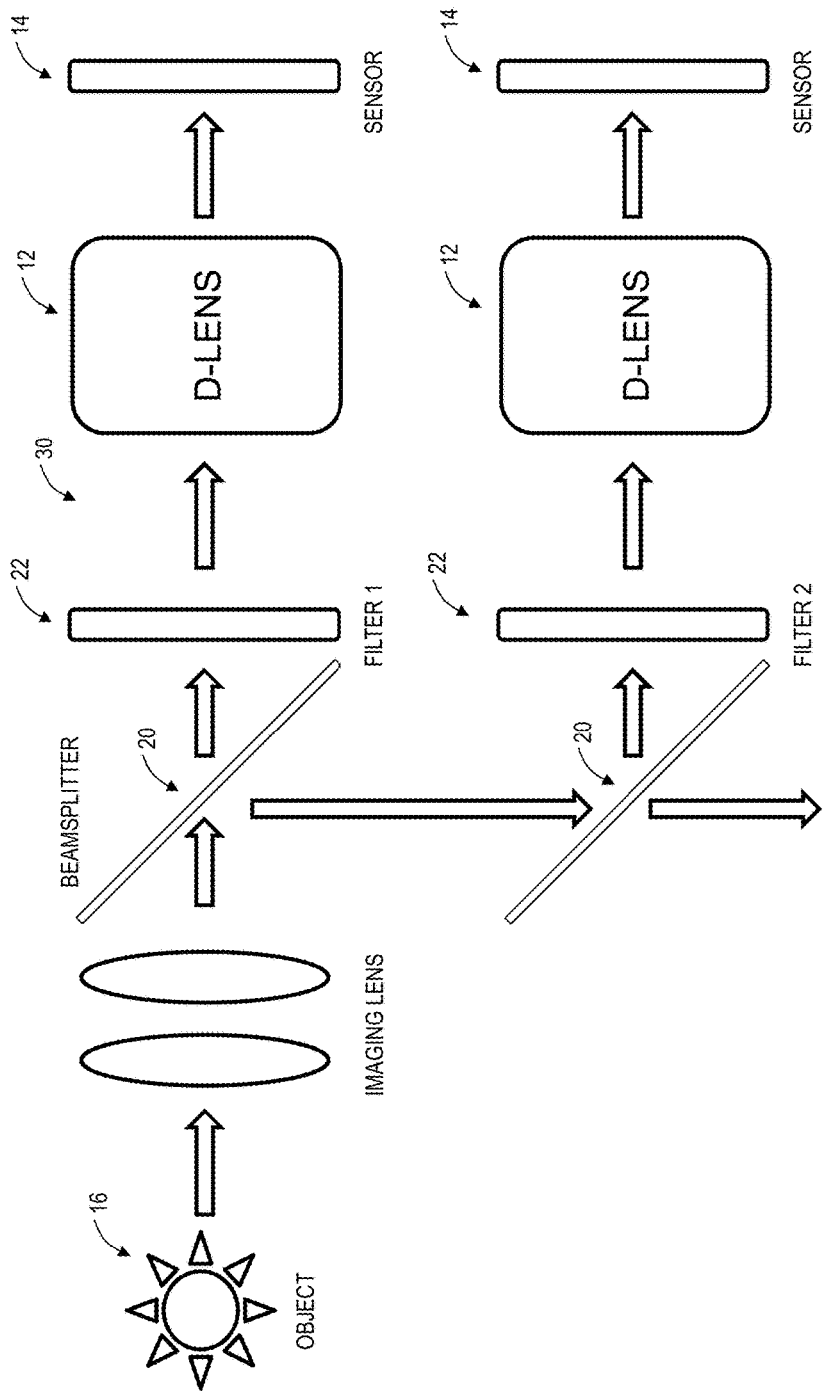
FIG. 3 is a schematic diagram illustrating a further exemplary embodiment of the spectral imaging system of the present invention incorporating a plurality of beamsplitters.

The following are exemplary configurations of the wavelength discriminating imaging system of the present invention. In FIG. 3, the scene/object 16 is imaged and divided into multiple beams using beamsplitters 20. Each divided light beam is filtered 22 to represent a specific wavelength band. The output of each filter 22 is analyzed using the proposed spectral wavelength discriminating system to calculate the spectral images. This spectral imaging system 30 can be combined with a three-dimensional (3-D) imaging system 32 to acquire both spectral and spatial information. The 3-D imaging system 32 can be any 3-D imaging system, including an imaging system using depth from focus, depth from defocus, or light field photography techniques to calculate the 3-D image (see FIG. 4).

Figure 4:
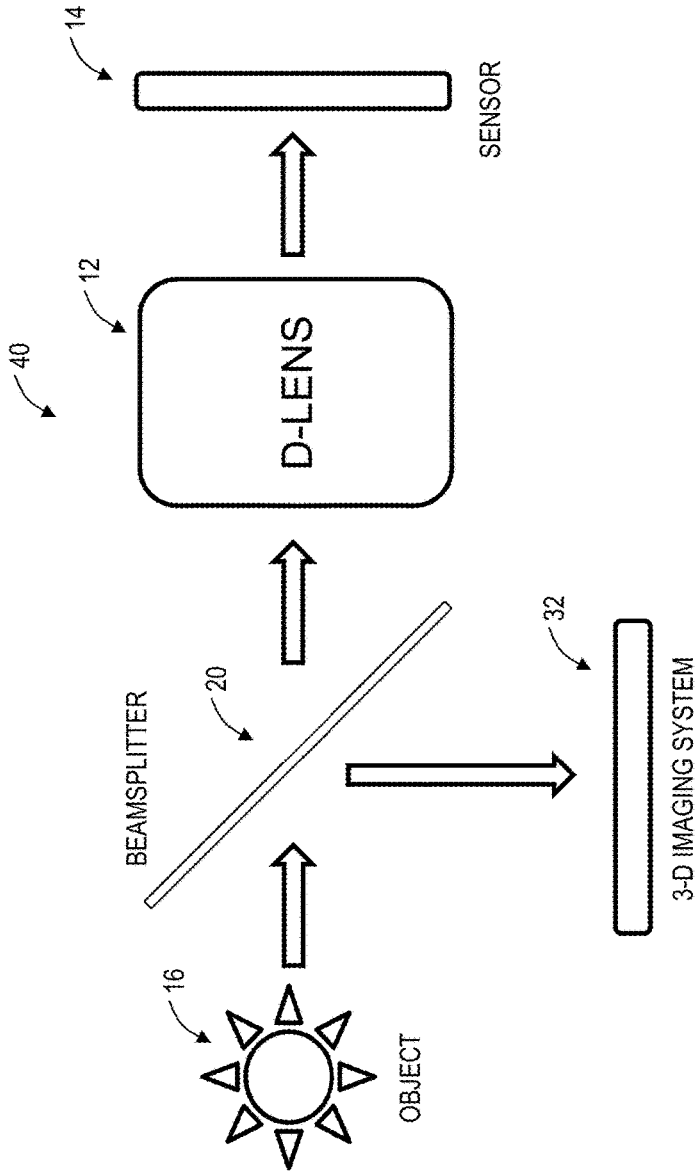
FIG. 4 is a schematic diagram illustrating a still further exemplary embodiment of the spectral imaging system of the present invention incorporating a beamsplitter and a 3-D imaging system.
Figure 5:
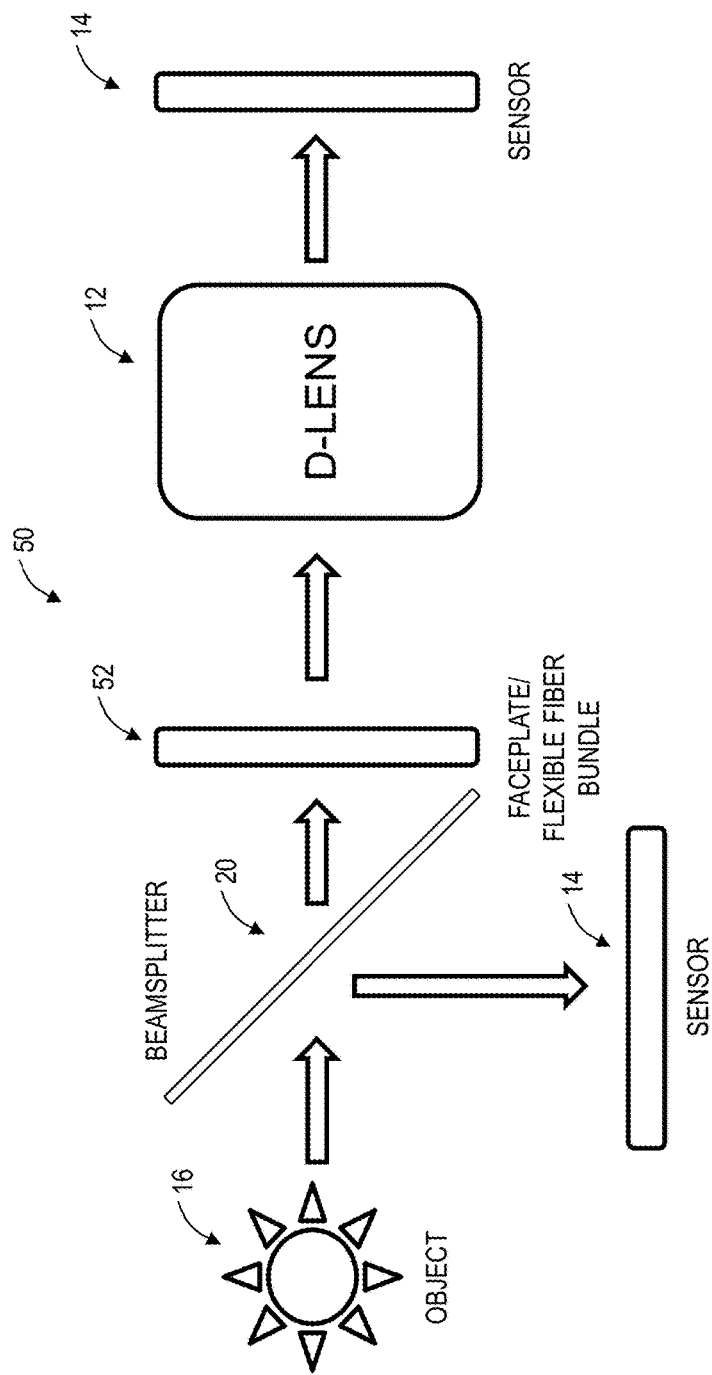
FIG. 5 is a schematic diagram illustrating a still further exemplary embodiment of the spectral imaging system of the present invention incorporating a faceplate/flexible fiber bundle.
Figure 6:
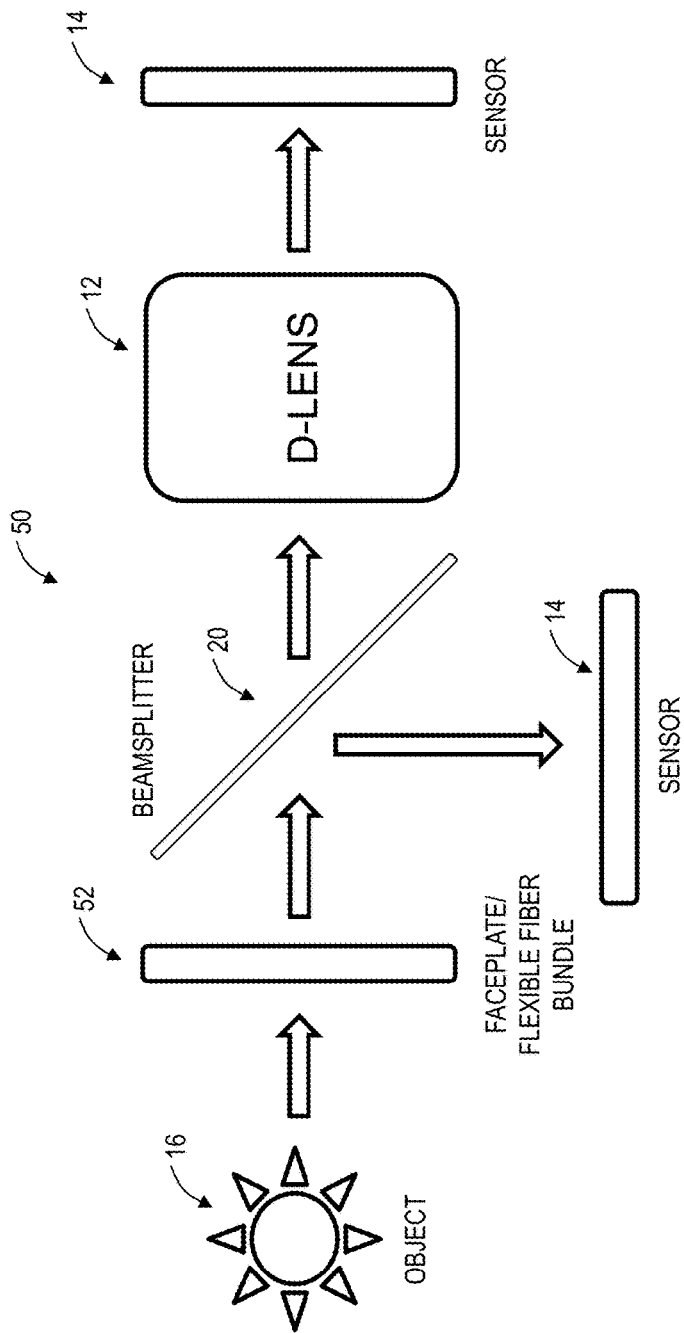
FIG. 6 is a schematic diagram illustrating a still further exemplary embodiment of the spectral imaging system of the present invention incorporating a faceplate/flexible fiber bundle.

FIG. 4 illustrates a combination spectral and 3-D imaging system 40 to acquire both the spectral and spatial information. The three-dimensional scene/object 16 can be converted into a two-dimensional image by imaging the scene/object 16 onto a plane. Converting a 3-D scene/object 16 into a 2-D image eliminates any confusion between the depth information that results from a 3-D scene/object 16 and the depth information that is a result of the dispersion. Converting a 3-D scene/object 16 into a 2-D image is realized by using a faceplate or flexible fiber bundle 52. The captured image then is fed into the spectral imaging system 50 to extract the spectral information. This is illustrated in FIGS. 5 and 6. The configuration explained previously can be combined with 3-D imaging to acquire both spectral and spatial information. The element that converts the 3-D scene/object 16 into a 2-D image (e.g. the faceplate or a flexible fiber bundle 52) can be placed before or after the beamsplitter 20. Another possibility is to integrate the beamsplitter 20 into the faceplate or the flexible fiber bundle 52. The faceplate or the flexible fiber bundle 52 utilizes a numerical aperture equal to or less than one (1), and optimal numerical aperture may be utilized to harvest more power.

The spectral imaging system can be improved using an auxiliary 2D or 3D imaging system. The improvement can be, but is not limited to, in the reduction or elimination of unwanted aberration, increasing the spatial resolution of spectral images, and/or increasing the spectral resolution of spectral images. The auxiliary 2D or 3D imaging system can be integrated into the spectral imaging system, e.g. by the means of a beamsplitter. The 2D or 3D imaging system can be grayscale or color (e.g. RGB color) images.

Figure 9:
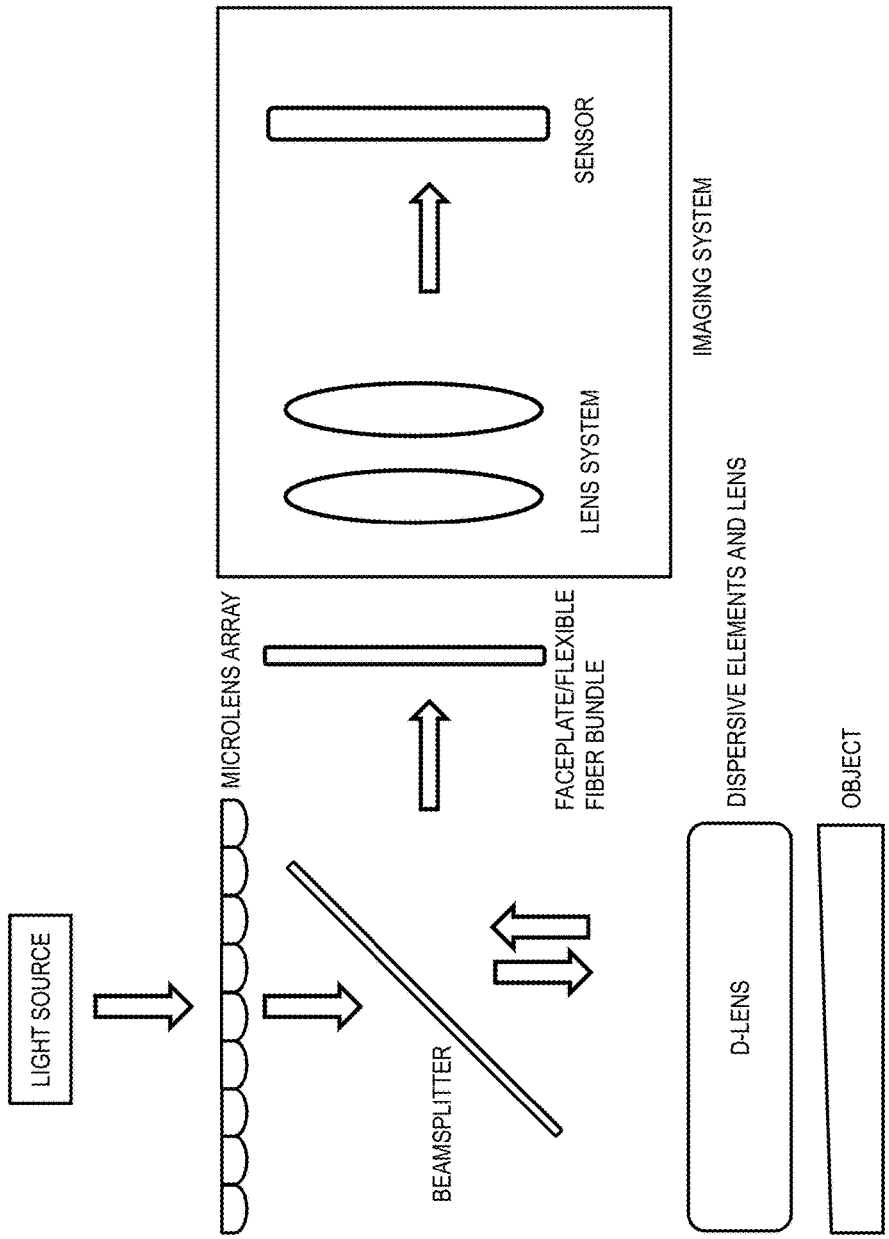
FIG. 9 is a schematic diagram illustrating a still further exemplary embodiment of the spectral imaging system of the present invention.

The following are exemplary configurations of the confocal imaging system of the present invention. In FIG. 9, the light is divided into an array of lights by passing through a microlens array. Divided lights pass through a pinhole array, which is placed at the focal plane of microlens array. Then divided lights pass through a D-lens, which results in focusing each wavelength at a specific distance; therefore the whole or partial sectioning of the object is done without any movement in vertical direction. The imaging system then images the reflected/scattered back intensity from object to calculate the profile of the object.

When the system light source is a while light or a broadband light source, imaging system needed to be a spectral imaging system to separate different wavelengths, which can be one of the spectral imaging systems explained in the present invention. When the light source is tunable laser source or diode lasers which are turned ON in sequence, spectral imaging system is not needed and the imaging system may be a lens system and a sensor array responsive to the corresponding wavelengths. When the light source is combined of three red, green and blue wavelengths, the three wavelengths may be turned ON simultaneously and an RGB camera with a lens system may be used as imaging system.

Figure 10:
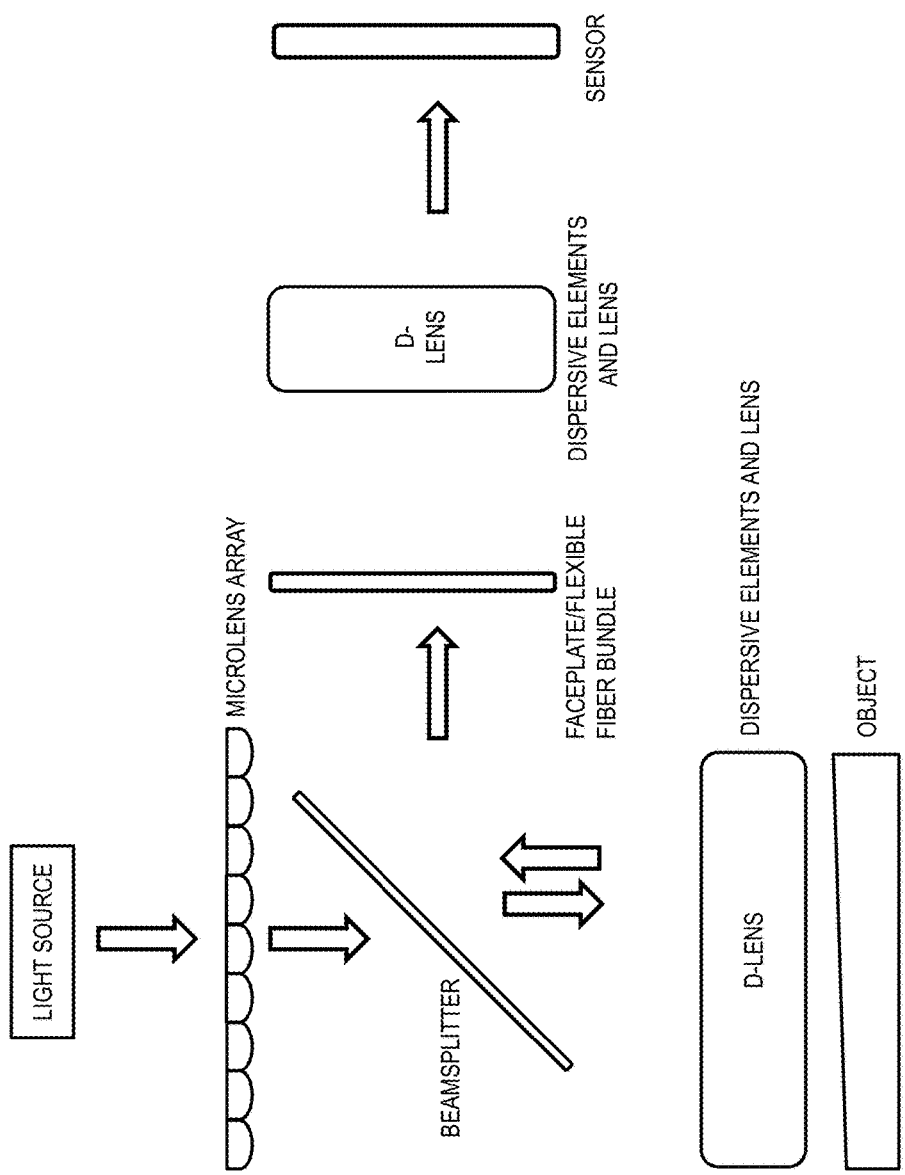
FIG. 10 is a schematic diagram illustrating a still further exemplary embodiment of the spectral imaging system of the present invention.

FIG. 10 illustrates a confocal imaging system, in which pinhole arrays are not used; microlens array and faceplate/flexible fiber bundle partially function as pinholes. Faceplate/flexible fiber bundle also flattens the light field.

Figure 11:
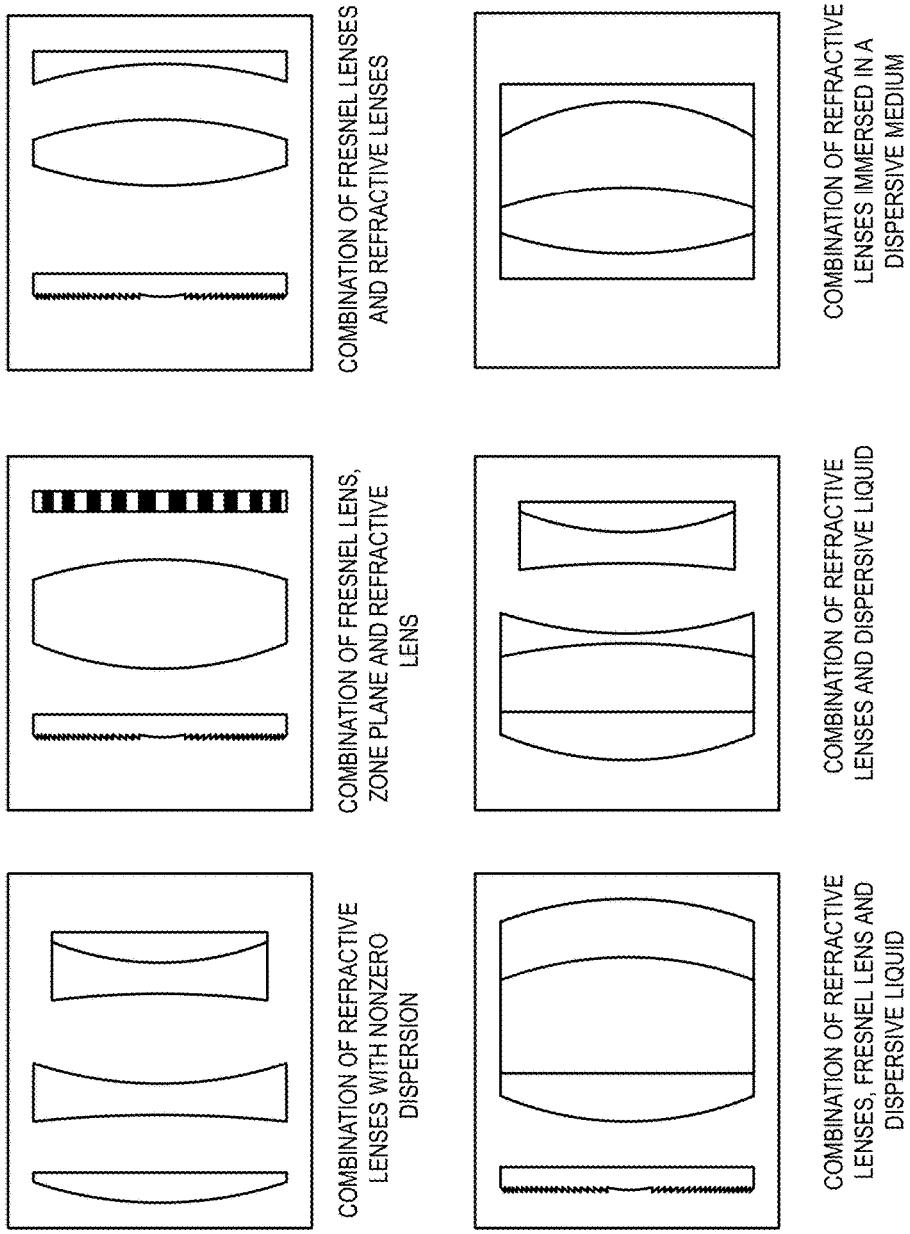
FIG. 11 is a series of schematic diagrams illustrating six (6) exemplary embodiments of the dispersive lens system of the spectral imaging system of the present invention.

FIG. 11 illustrates another implementation of confocal imaging system, in which pinhole arrays are not used; microlens array and faceplate/flexible fiber bundle partially function as pinholes. Faceplate/flexible fiber bundle also flattens the light field. A D-lens and sensor array function as spectral imaging system to separate different wavelength of the reflected/back scattered light from the object.

Simulations were performed in order to verify the feasibility of the proposed camera structure and technique for spectral imaging. The dispersive material used was a liquid with $n_F=1.6617$ ($\lambda_1=486$ nm), $n_D=1.6400$ ($\lambda_2=589$ nm), and $n_C=1.6320$ ($\lambda_3=656$ nm). In the simulations, the change of focal length of a lens system with a dispersive material involved as a material between lenses and/or as the material of the lens was evaluated. In the first simulation, the lens system consisted of two convex-concave lenses with radii of 4 mm (convex) and 6 mm (concave) with thicknesses of 2.9 mm; separated by 1 mm with the dispersive liquid. Table 1 shows the focal lengths of the D-lens at wavelengths $\lambda_1=486$ nm, $\lambda_2=589$ nm, and $\lambda_3=656$ nm. The focal length was calculated based on the smallest spot size. As seen in the table, the separation between the focal length of the shortest and longest wavelengths is about 0.13 mm. The assumption here is that the light source is collimated.

TABLE 1

Focal length and spot size for a D-lens consisting of two convex-concave lenses with radii of 4 mm (convex) and 6 mm (concave) with thicknesses of 2.9 mm; separated 1 mm with a dispersive liquid with $n_F$ = 1.6617, $n_D$ = 1.6400, and $n_C$ = 1.6320

| Wavelength (nm) | Field Diameter (mm) | Refractive Index | Focal Length (mm) | Spot Size (RMS) (μm) | Spot Size (GEO) (μm) |
|---|---|---|---|---|---|
| 486 | 1 | $n_F$ = 1.6617 | 1.65 | 0.504 | 0.911 |
| 589 | 1 | $n_D$ = 1.6400 | 1.74 | 0.505 | 0.914 |
| 656 | 1 | $n_C$ = 1.6320 | 1.78 | 0.506 | 0.915 |

The next simulation was for a D-lens optical system that consisted of two bi-convex lenses with diameters of 4 mm and a radius of curvature of 4 mm and a thickness of 2.9 mm separated by 5 mm and the gap was filled with dispersive liquid. Table 2 shows the focal lengths and corresponding spot sizes at different wavelengths. For this configuration, the difference between focal length of shortest and longest wavelengths was about 0.13 mm.

TABLE 2

Focal length and spot size for a D-lens consisting of two bi-convex lenses with diameter of 4 mm and radius of curvature of 4 mm and thickness of 2.9 mm separated by 5 mm and the gap is filled with dispersive liquid with $n_F$ = 1.6617, $n_D$ = 1.6400, and $n_C$ = 1.6320

| Wavelength (nm) | Field Diameter (mm) | Refractive Index | Focal Length (mm) | Spot Size (RMS) (μm) | Spot Size (GEO) (μm) |
|---|---|---|---|---|---|
| 486 | 1 | $n_F$ = 1.6617 | 2.14 | 0.179 | 0.322 |
| 589 | 1 | $n_D$ = 1.6400 | 2.00 | 0.192 | 0.374 |
| 656 | 1 | $n_C$ = 1.6320 | 1.96 | 0.197 | 0.356 |

For third simulation, a Fresnel lens was used as a dispersive element. The Fresnel lens had a radial height of 3 mm, radius of 11.15 mm, and thickness of 1.5 mm. Table 3 shows the focal length for different wavelengths. The focal length difference between the shortest and longest wavelength was about 0.33 mm. Again, here it was assumed that the light source is collimated.

TABLE 3

Focal length and spot size for a D-lens consisting of a Fresnel lens made from the same material as dispersive liquid with $n_F$ = 1.6617, $n_D$ = 1.6400, and $n_C$ = 1.6320. Fresnel lens had a radial height of 3 mm, radius of 11.15 mm, and thickness of 1.5 mm

| Wavelength (nm) | Field Diameter (mm) | Refractive Index | Focal Length (mm) | Spot Size (RMS) (μm) | Spot Size (GEO) (μm) |
|---|---|---|---|---|---|
| 486 | 1 | $n_F$ = 1.6617 | 1.83 | 0.13 | 0.178 |
| 589 | 1 | $n_D$ = 1.6400 | 2.06 | 0.129 | 0.178 |
| 656 | 1 | $n_C$ = 1.6320 | 2.16 | 0.129 | 0.177 |

The last simulation was for a two microlens arrays with 0.1 mm thickness, 1 mm radius of curvature, and 0.4 mm height. The gap between two microlenses was 2 mm, which was filled with dispersive liquid. A plano-concave lens was put 1 mm in front of the microlenses. Table 4 shows the focal length at different wavelengths and their corresponding spot sizes. Note that the plano-concave lenses made collimated light diverge and therefore made the difference between the focal length of shortest and longest wavelengths about 57 mm.

TABLE 4

Focal length and spot size for a D-lens consisting of 2 microlens array with 0.1 mm thickness, 1 mm radius of curvature, and 0.4 mm height. The gap between the two microlenses is 2 mm and is filled with a dispersive liquid. A plano-concave lens is put 1 mm in front of the microlenses

| Wavelength (nm) | Field Diameter (mm) | Refractive Index | Focal Length (mm) | Spot Size (RMS) (μm) for different wavelength | | | Spot Size (GEO) (μm) for different wavelength | | |
|---|---|---|---|---|---|---|---|---|---|
| | | | | 486 | 589 | 656 | 486 | 89 | 656 |
| 486 | 10 | $n_F$ = 1.6617 | 132.13 | 0.528 | 11.26 | 16.73 | 0.596 | 14.03 | 20.82 |
| 589 | 10 | $n_D$ = 1.6400 | 166.55 | 15.43 | 0.667 | 6.19 | 19.1 | 0.751 | 7.76 |
| 656 | 10 | $n_C$ = 1.6320 | 189.25 | 25.28 | 8.52 | 0.759 | 31.31 | 10.51 | 0.856 |

An experiment was conducted to validate the simulation results. A D-lens was made by piercing the middle of an objective lens and filling that part with dispersive liquid. Then, two different lasers (green and red HeNe lasers) were used to measure the image plane distance where the spot size was minimum; the minimum spot size occurred roughly at 10 cm and 11 m from the D-lens for the red laser and the green laser, respectively. Therefore, the D-lens showed good dispersion properties.

Another implementation of the spectral imaging system using a D-lens is in microscopy. In this case, a regular Light Field Camera or a DFD or a DFF may be used in a microscope. However, one could use a D-lens objective similar to the one described herein above as an objective of the microscope itself. In this system, the wavelength-to-depth conversion occurs at the microscope objective and not at the camera. Such a microscope could easily create multiple images of different colors from a single plane object.

Figure 7:
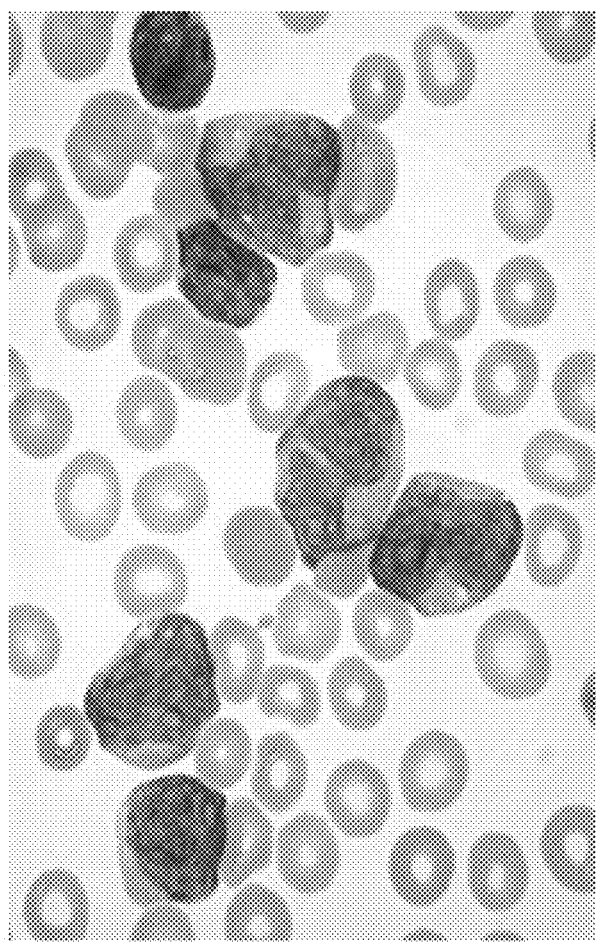
FIG. 7 is a photograph illustrating a microscope application of the present invention in which a smear contains cells of different types with different spectral contents.
Figure 8:
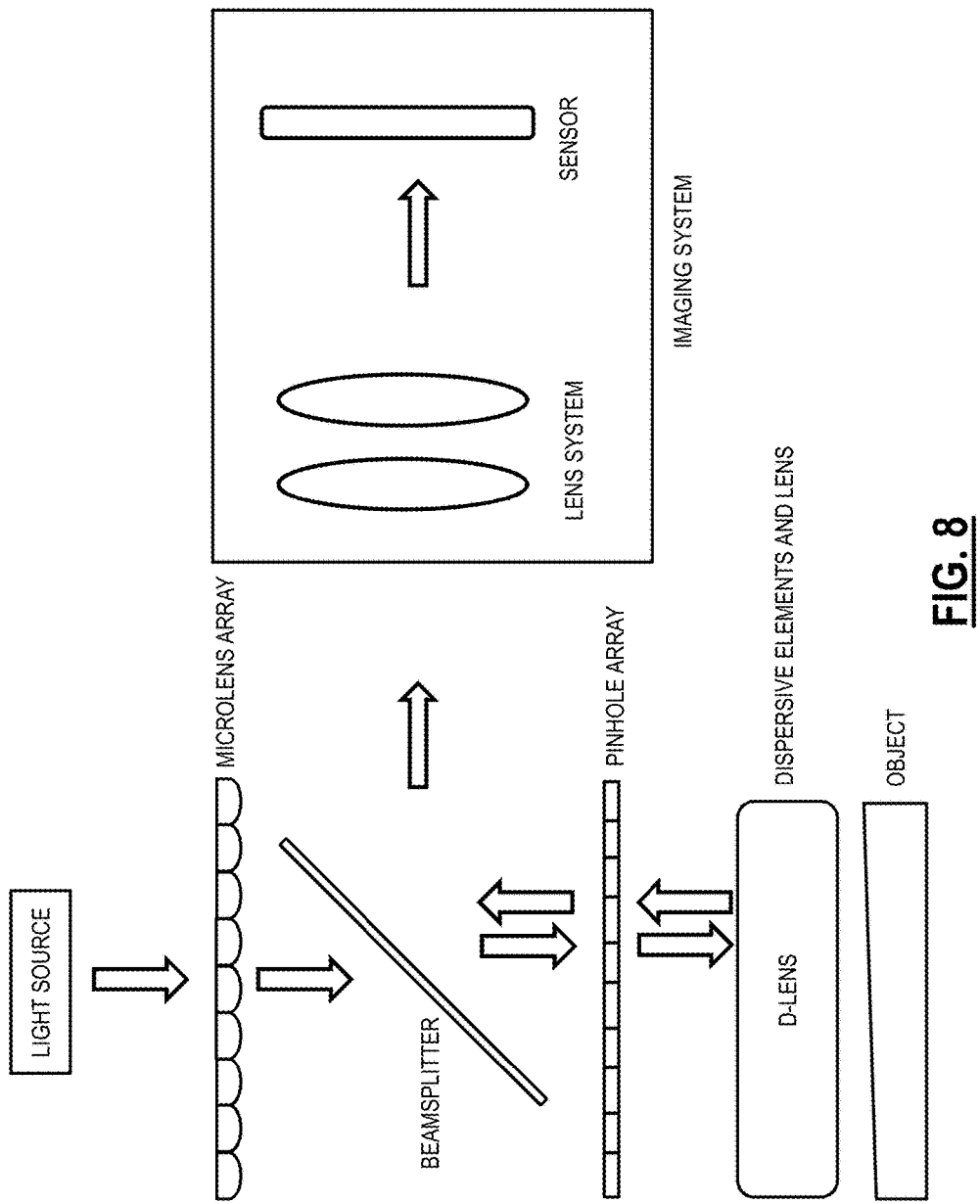
FIG. 8 is a schematic diagram illustrating a still further exemplary embodiment of the spectral imaging system of the present invention.

For example, an aspirate smear of some sample cells could be used as an object. As it is shown in FIG. 7, this smear contains cells of different types with different spectral contents. The proposed microscope is able to separate the cells according to their colors (i.e. spectral information) and therefore, sort the cells, and cell counting is much easier.

The proposed technique can be used to recover both topography and spectral content of an object/scene. One way to do this is to first use the imaging system with conventional lens and using the depth measurement techniques to recover the topography of the object and then use the imaging system with a D-lens and using the depth measurement techniques to obtain the spectral content of the object/scene. It is also possible to do the measurement with two lenses with different dispersion properties in combination with a Light Field Camera or a DFD or a DFF technique.

The D-lens of the present disclosure can also be used in a confocal configuration (FIG. 9). Since the D-lens has different focal lengths for different wavelengths, by using a light source with a broad spectrum, a tunable laser source, or separate diode lasers at different wavelengths, each point of the object has a focused image at a specific wavelength. This wavelength depends on the profile (i.e. height) of the object at that specific point. The confocal configuration may consist of microlenses in order to image several points of the object at once, therefore, the confocal image may be obtained without any need to x-y scan. When the system light source is a while light or a broadband light source, a spectral imaging system is needed to separate different wavelengths which can be one of the spectral imaging systems explained above. When the light source is tunable laser source or diode lasers which are turned ON in sequence, spectral imaging system is not needed and a sensor array responsive to the corresponding wavelengths is sufficient. When the light source is combined of three red, green and blue wavelengths, the three wavelengths may be turned ON simultaneously and an RGB camera be used as sensor array. The confocal system can include a faceplate or a flexible fiber bundle (FIG. 10). Each fiber or a set of neighboring fibers acts as a pinhole.

Besides the confocal configuration, the system can include a light field configuration in order to simultaneously calculate both the spectral content and the profile of an object.

Other potential applications include, but are not limited to:
  Spectral imaging for forensic evidence detection (e.g. blood detection)
  Spectral imaging for biological measurement (i.e. wherever a biological entity has a spectral signature)
  Spectral imaging for remote sensing applications
  Spectral imaging for height measurement FIG. 11 is a series of schematic diagrams illustrating six (6) exemplary embodiments of the dispersive lens system of the spectral imaging system of the present invention. The implementation of the dispersive lens system includes a combination of refractive lenses with dispersion, a combination of Fresnel lenses, a zone plate and refractive lenses, a combination of Fresnel lenses and refractive lenses, a combination of refractive lenses, a Fresnel lens and a dispersive liquid, a combination of refractive lenses and a dispersive liquid, and a combination of refractive lenses immersed in a dispersive medium, for example.

There are many different techniques for spectral imaging. In one category the spectral images are scanned point by point or line by line (spatial scanning). Each point/line is connected to a spectrometer or an array of spectrometers to extract the spectral information of the corresponding point/line. Therefore the whole data cube of the spectral image data is captured. Examples of this technique include pushbroom imaging spectrometer and whiskbroom imaging spectrometer. Another type of spectral imaging system uses wavelength scanning techniques. In this technique, there is filter for each specific wavelength band and the images at each wavelength is captured using the corresponding filter or the scene is illuminated with light with different wavelengths. An example of this type of spectral imaging system is a tunable filter spectral imaging system. The third type of spectral imaging system captures the data cube spectral images at once. The examples of this technique are computed tomography imaging spectrometry (CTIS) and coded aperture snapshot spectral imager (CASSI). In CTIS, a diffractive element like grating is used to image difference wavelength content of the image at different angles. In CASSI, the same concept is combined with compressive imaging technique in order to acquire less data than other techniques while computing the same datacube.

The present technique is different from the first technique (spatial scanning) in the way that it is not scanning spatially and the spectrum of all points of the image are captured at once. The present technique is different from the second technique (wavelength scanning) in the way that it does not use filters or narrowband illumination to discriminate between every single wavelength. Instead, a dispersive element (D-lens) does separate the wavelengths spatially. The present technique is different from computed tomography imaging spectrometry (CTIS) in the way that our technique uses a dispersive element that separate wavelengths in different distance other than separating in different angles. In addition the D-lens also images the object, too (it contributes to the total imaging system, e.g. it changes the focal lengths for different wavelength) while the diffractive element in CTIS is only responsible for changing the direction of light for each wavelength and does not have any role in imaging. The present technique is different from coded aperture snapshot spectral imager (CASSI) the same way that it is different from CTIS. Our technique uses a dispersive element that separate wavelength in different distance other than separating in different angles. In addition the D-lens also images the object, too (it contributes to the total imaging system, e.g. it changes the focal lengths for different wavelength) while the diffractive element in CASSI only is responsible for changing the direction of light for each wavelength and does not have role in imaging.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:
1. A spectral imaging system, comprising:
  a dispersive element operable for separating wavelengths associated with an image of an object by distance;
  an algorithm operable for identifying each of the separated wavelengths associated with the image using the distances; and
  one or more sensors operable for determining intensity at each of the separated and identified wavelengths associated with the image and at each of the distances;

wherein the dispersive element is disposed at a distance from the object;

wherein the algorithm provides data in two spatial dimensions and a spectral dimension; and wherein the data in the two spatial dimensions is captured simultaneously.

2. The spectral imaging system of claim 1, wherein the dispersive element comprises one or more lenses and a dispersive medium.

3. The spectral imaging system of claim 2, wherein the dispersive medium comprises one or more dispersive lenses.

4. The spectral imaging system of claim 1, wherein the dispersive element comprises one or more lenses with dispersion.

5. The spectral imaging system of claim 1, further comprising a light field camera.

6. The spectral imaging system of claim 1, further comprising a microlens array.

7. The spectral imaging system of claim 1, further comprising an array of dispersive lenses.

8. The spectral imaging system of claim 1, further comprising a translation mechanism operable for moving the one or more sensors and one or more lenses.

9. The spectral imaging system of claim 1, further comprising a lens array having varying focal lengths.

10. The spectral imaging system of claim 1, further comprising a lens array having varying displacements with respect to a lens array plane.

11. The spectral imaging system of claim 1, further comprising a plurality of lens arrays having varying focal lengths and varying displacements with respect to a lens array plane.

12. The spectral imaging system of claim 1, further comprising a lens system and one or more beamsplitters/image splitters operable for dividing a beam/image into a plurality of beams/images.

13. The spectral imaging system of claim 12, further comprising one or more filters operable for separating wavelengths.

14. The spectral imaging system of claim 1, further comprising a profilometry algorithm operable for acquiring both depth and spectral information.

15. The spectral imaging system of claim 1, further comprising one of a 2D or 3D grayscale imaging system or a 2D or 3D color imaging system.

16. A spectral imaging method, comprising:

providing a dispersive element operable for separating wavelengths associated with an image of an object by distance;

providing an algorithm operable for identifying each of the separated wavelengths associated with the image using the distances; and providing one or more sensors operable for determining intensity at each of the separated and identified wavelengths associated with the image and at each of the distances;

wherein the dispersive element is disposed at a distance from the object;

wherein the algorithm provides data in two spatial dimensions and a spectral dimension; and wherein the data in the two spatial dimensions is captured simultaneously.

17. The spectral imaging method of claim 16, wherein the dispersive element comprises one or more lenses and a dispersive medium.

18. The spectral imaging method of claim 17, wherein the dispersive medium comprises one or more dispersive lenses.

19. The spectral imaging method of claim 16, wherein the dispersive element comprises one or more lenses with dispersion.

20. The spectral imaging method of claim 16, further comprising providing a light field camera.

21. The spectral imaging method of claim 16, further comprising providing a microlens array.

22. The spectral imaging method of claim 16, further comprising providing an array of dispersive lenses.

23. The spectral imaging method of claim 16, further comprising providing a translation mechanism operable for moving the one or more sensors and one or more lenses.

24. The spectral imaging method of claim 16, further comprising providing a lens array having varying focal lengths.

25. The spectral imaging method of claim 16, further comprising providing a lens array having varying displacements with respect to a lens array plane.

26. The spectral imaging method of claim 16, further comprising providing a plurality of lens arrays having varying focal lengths and varying displacements with respect to a lens array plane.

27. The spectral imaging method of claim 16, further comprising providing a lens system and one or more beamsplitters/image splitters operable for dividing a beam/image into a plurality of beams/images.

28. The spectral imaging method of claim 27, further comprising providing one or more filters operable for separating wavelengths.

29. The spectral imaging method of claim 16, further comprising providing a profilometry algorithm operable for acquiring both depth and spectral information.

30. The spectral imaging method of claim 16, further comprising providing one of a 2D or 3D grayscale imaging system or a 2D or 3D color imaging system.

* * * * *